(12) United States Patent
Neuhaus et al.

(10) Patent No.: US 12,082,693 B2
(45) Date of Patent: Sep. 10, 2024

(54) ROLLER CARRIAGE

(71) Applicant: Accuride International GmbH, Diez (DE)

(72) Inventors: Christoph Neuhaus, Niederelbert (DE); Thomas Quirein, Diez (DE)

(73) Assignee: Accuride International GmbH, Diez (DE)

( * ) Notice: Subject to any disclaimer, the term of this patent is extended or adjusted under 35 U.S.C. 154(b) by 272 days.

(21) Appl. No.: 17/620,011

(22) PCT Filed: Jul. 14, 2020

(86) PCT No.: PCT/EP2020/069914
§ 371 (c)(1),
(2) Date: Dec. 16, 2021

(87) PCT Pub. No.: WO2021/009181
PCT Pub. Date: Jan. 21, 2021

(65) Prior Publication Data
US 2022/0364594 A1    Nov. 17, 2022

(30) Foreign Application Priority Data
Jul. 17, 2019   (DE) .......................... 102019119337.0

(51) Int. Cl.
*F16C 29/04*    (2006.01)
*A47B 88/437*   (2017.01)
(Continued)

(52) U.S. Cl.
CPC .......... *A47B 88/437* (2017.01); *A47B 88/473* (2017.01); *F16C 29/045* (2013.01); *F16C 29/10* (2013.01)

(58) Field of Classification Search
CPC ...... F16C 29/002; F16C 29/045; F16C 29/10; F16C 29/123; A47B 88/437; A47B 88/473
See application file for complete search history.

(56) References Cited

U.S. PATENT DOCUMENTS

| 1,926,828 A | 9/1933 | Van Berkel |
| 4,158,315 A * | 6/1979 | Kensrue ................... B23Q 5/56 266/71 |

(Continued)

FOREIGN PATENT DOCUMENTS

| DE | 464 431 C | 8/1928 |
| DE | 32 33 971 A1 | 3/1983 |

(Continued)

*Primary Examiner* — James Pilkington
(74) *Attorney, Agent, or Firm* — Faegre Drinker Biddle & Reath LLP

(57) ABSTRACT

A roller carriage for displaceable linear guidance in a longitudinal direction on a rail element is disclosed. The roller carriage includes a carrier and a first, second, and third roller. The first, second, and third rollers are each mounted on the carrier such that each can rotate about a rotating axle. The rotating axles are substantially parallel to one another and the first, second, and third rollers are disposed on the roller carriage such that the first roller can be brought into engagement with a first track of the rail element and the second and third rollers can be brought into engagement with a second track of the rail element. The first roller is mounted such that it can move in a transverse direction perpendicular to the longitudinal direction relative to the carrier and is resiliently pretensioned in transverse direction by a first spring element.

11 Claims, 7 Drawing Sheets

(51) Int. Cl.
    *A47B 88/473*     (2017.01)
    *F16C 29/10*     (2006.01)

(56) References Cited

U.S. PATENT DOCUMENTS

| | | |
|---|---|---|
| 4,390,216 A | 6/1983 | Mueller et al. |
| 4,714,354 A | 12/1987 | Satomi |
| 5,642,941 A | 7/1997 | Mouezy |
| 5,735,214 A * | 4/1998 | Tsuboi .................. F16C 29/005     384/57 |
| 8,152,378 B2 * | 4/2012 | Tsai ...................... F16C 29/045     384/57 |

FOREIGN PATENT DOCUMENTS

| | | |
|---|---|---|
| JP | H11 37154 A | 2/1999 |
| WO | WO-2013/056728 A1 | 4/2013 |

* cited by examiner

ROLLER CARRIAGE

CROSS REFERENCE TO RELATED APPLICATIONS

This application is a National Stage of International Application No. PCT/EP2020/069914 filed Jul. 14, 2020, which claims benefit of German Patent Application No. 10 2019 119 337.0 filed Jul. 17, 2019, both of which are herein incorporated by reference in their entirety.

TECHNICAL FIELD

The present invention relates to a roller carriage for displaceable guidance in a longitudinal direction on a rail element, wherein the roller carriage comprises a carrier and a first roller or a first pair of rollers, a second roller or a second pair of rollers, and a third roller or a third pair of rollers, wherein every one of the first roller or the first pair of rollers, the second roller or the second pair of rollers, and the third roller or the third pair of rollers is mounted on the carrier such that each can rotate about a rotating axle, wherein the rotating axles are substantially parallel to one another and wherein the first roller or the first pair of rollers, the second roller or the second pair of rollers, and the third roller or the third pair of rollers are disposed on the roller carriage such that the first roller or the first pair of rollers can be brought into engagement with a first track of the rail element and the second roller or the second pair of rollers and the third roller or the third pair of rollers can be brought into engagement with a second track of the rail element.

Linear guides having two rail elements and a guide between the two rail elements are known in a wide variety of embodiments. In many such linear guides, the guide between the two rail elements is implemented in the form of a rolling element cage. The rolling element cage accommodates rolling elements to reduce friction between the rail elements when said rail elements move relative to one another. Such linear guides are used in a variety of household appliances, as well as in the automotive industry, in furniture construction and in many other applications. In some variants, one of the rail elements is significantly shorter than the other. If such a linear guide is to be used to implement a very long displacement path, it is in particular necessary to maintain tight tolerances when manufacturing the long rail element.

SUMMARY

The problem of the present invention, however, is to create a roller carriage for a linear guide and a linear guide, in which the requirements for the manufacturing tolerances when producing the long rail element are reduced.

To solve said problem, a roller carriage for displaceable guidance in a longitudinal direction on a rail element is proposed, wherein the roller carriage comprises a carrier and a first roller or a first pair of rollers, a second roller or a second pair of rollers, and a third roller or a third pair of rollers, wherein every one of the first roller or the first pair of rollers, the second roller or the second pair of rollers, and the third roller or the third pair of rollers is mounted on the carrier such that each can rotate about a rotating axle, wherein the rotating axles are substantially parallel to one another and wherein the first roller or the first pair of rollers, the second roller or the second pair of rollers, and the third roller or the third pair of rollers are disposed on the roller carriage such that the first roller or the first pair of rollers can be brought into engagement with a first track of the rail element and the second roller or the second pair of rollers and the third roller or the third pair of rollers can be brought into engagement with a second track of the rail element, wherein one of the first roller or the first pair of rollers, the second roller or the second pair of rollers, and the third roller or the third pair of rollers is mounted such that it can be moved in a transverse direction perpendicular to the longitudinal direction relative to the carrier, and wherein the movably mounted roller or the movably mounted pair of rollers is resiliently pretensioned in transverse direction by a first spring element.

The underlying idea of the present invention is to replace one of the rail elements in a linear guide, in particular the shorter rail element, with a roller carriage. Due to the movable mounting of one of the rollers or pairs of rollers in transverse direction, the roller carriage according to the invention enables compensation of manufacturing tolerances that occur over the length of the rail element.

In the context of the present application, a pair of rollers refers to a tandem arrangement of exactly two rollers. The rotating axles of the two rollers of the pair of rollers are mounted on a common axle beam, which can in turn be pivoted relative to the carrier of the roller carriage about a pivot axis. In one embodiment, the pivot axis is disposed at a position in which, in an alternative embodiment, the rotating axle of a single roller is mounted on the carrier. In one embodiment of the invention, the two rotating axles of the pair of rollers have the smallest possible center distance for a given diameter of the two rollers.

Such a tolerance compensation on a roller carriage is in principle also possible in embodiments comprising more than three rollers or pairs of rollers. However, in one embodiment of the invention, the roller carriage comprises exactly three rollers or pairs of rollers, wherein exactly one of the first roller or the first pair of rollers, the second roller or the second pair of rollers, and the third roller or the third pair of rollers is resiliently pretensioned in transverse direction. Such a roller carriage comprising three rollers or three pairs of rollers enables optimized tolerance compensation with reduced structural complexity.

While it is possible to provide exactly three pairs of rollers as a tandem arrangement in such an embodiment, in one embodiment the roller carriage comprises exactly one pair of rollers as a tandem arrangement and exactly two other single rollers.

In one embodiment of the invention, the first roller or the first pair of rollers is pretensioned perpendicular to the longitudinal direction. Such an implementation is useful in particular when the roller carriage comprises exactly three rollers or pairs of rollers, but in particular when it comprises one pair of rollers, namely the first pair of rollers, and two individual rollers, namely the second and third rollers.

In one embodiment of the invention, the first roller or the first pair of rollers is disposed in longitudinal direction between the second roller or the second pair of rollers and the third roller or the third pair of rollers. This is in particular advantageous when the roller carriage comprises exactly three rollers or pairs of rollers.

In one embodiment of the invention, the mounting of a roller or pair of rollers such that it/they can move in transverse direction is implemented with the aid of a slotted guide, for example in the form of a pin which is movably mounted in an elongated hole that extends in transverse direction.

In one embodiment of the invention, the roller carriage comprises a lever which can be pivoted relative to the carrier about a pivot axis, wherein the lever comprises a first arm, wherein the movably mounted roller or the pair of rollers, in particular the first roller or the first pair of rollers, is mounted on the first arm such that it can rotate about the respective rotating axle and wherein the lever is resiliently pretensioned in a pivoting direction by the first spring element. Such a swing arm mounting of the movably mounted roller or the movably mounted pair of rollers, in particular the first roller or the first pair of rollers, is structurally simple and fail-safe.

If, instead of a single roller, a pair of rollers is mounted on the lever in a tandem arrangement, the pivot axis of the axle beam in one embodiment is mounted at a point on the lever at which, in a design with only one roller, the axis point of said one roller would be disposed.

In one embodiment, the lever comprises a second arm in addition to the first arm, wherein the pivot axis divides the lever into the first arm and the second arm, wherein a brake shoe which can be brought into engagement with the first track is disposed on the second arm so that the movably mounted roller or the pair of rollers, in particular the first roller or the first pair of rollers, can be pivoted from a guiding position into a free position and at the same time the brake shoe can be pivoted from a released position into a braking position. In this embodiment, a single movable element, namely the lever, can be used to implement both a braking function and, at the same time, the tolerance compensation according to the invention. It goes without saying that, when the brake shoe is in the braking position, the roller or the pair of rollers is also in the free position, so that the roller or the pair of rollers is out of engagement with the corresponding track of the rail element.

In one embodiment of the present invention, the lever is resiliently pretensioned such that, in a relatively relaxed state of the first spring element, the brake shoe is in the braking position and the movably mounted roller or the pair of rollers, in particular the first roller or the first pair of rollers, is in the free position and that, in a state of the first spring element in which it is tensioned relative to the relaxed state, the brake shoe is in the released position and the movably mounted roller or the pair of rollers, in particular the first roller or the first pair of rollers, is in the guiding position. In other words, in such an embodiment of the invention, the lever is pretensioned such that it presses the brake shoe in the direction of the corresponding track of the rail element. To release the braking effect of the brake shoe, the lever has to be pivoted against the spring force of the first spring element. In such an embodiment of the roller carriage, the initial state of the roller carriage is braked and the braking effect has to be released against the spring force of the first spring element. At the same time, the movably mounted roller or the movably mounted pair of rollers, in particular the first roller or the first pair of rollers, then comes into engagement with the track of the rail.

To release the braking effect, in one embodiment, the lever comprises an actuation point which can be brought into engagement with an actuating means.

In one embodiment of the invention, the roller carriage comprises such an actuating means in the form of operating element which can be actuated by a user. One example of such an operating element is a lever-like linkage, for example such as those known from seat adjusters for motor vehicles. In one embodiment of the invention, the operating element is a Bowden cable, preferably comprising a trigger lever at the second end of the Bowden cable. In another embodiment, the operating element is an electric actuator, for example an electric motor or an electric linear drive.

However, in another embodiment, the operating element is not an element of the roller carriage and is brought into engagement with the actuation point in order to actuate the lever.

In one embodiment of the invention, the roller carriage comprises an actuating means, wherein the actuating means is a locking bolt, wherein the locking bolt is mounted on the carrier such that it can move, preferably be linearly displaced, in a transverse direction from a locking position via an unlocking position into an actuating position. The locking bolt is resiliently pretensioned into the locking position by a second spring element. It goes without saying that, in the locking position, the locking bolt engages in a recess, for example a hole in the rail element, in order to achieve the locking effect in the manner of a pawl.

In one embodiment, the locking bolt is mounted on the carrier such that it can move in the same transverse direction, in particular in the so-called vertical direction, as the movably mounted roller or the pair of rollers. The locking bolt then engages in a recess in or next to a running surface of the rail element, for example. It is, however, also possible to implement an embodiment in which the locking bolt is mounted on the carrier such that it can move in a direction perpendicular to the direction of movement of the rollers or the pair of rollers. In such an embodiment, the locking bolt engages, in a recess in a back of the rail element that connects the running surfaces.

The locking bolt and the lever having the actuation point are furthermore configured and disposed such that, when the brake shoe is in the braking position, the locking bolt can be moved from the locking position into the unlocking position against a spring force of the second spring element while the brake shoe remains in the braking position and that, when the locking bolt is moved from the unlocking position into the actuating position against the spring force of the second spring element, the locking bolt is in engagement with the actuation point and pivots the lever. During this pivoting movement of the lever driven by the locking bolt, the brake shoe is pivoted from the braking position into the released position and at the same time the first roller or the first pair of rollers is pivoted from the free position into the guiding position in engagement with the first running surface of the rail element.

In one embodiment of the invention, the locking bolt comprises an index search pin. The index search pin comprises three locking pins that are pretensioned in a housing such that they can move in the direction of the rail element. The housing in turn moves along with a shaft of the locking bolt. The pins are spaced at different distances from one another, which in turn differ from the regular spacing of the recesses in the rail element. This increases the number of locking positions.

The mode of operation of this embodiment is analogous to that described above, wherein the shaft of the locking bolt and the lever having the actuation point are configured and disposed such that, when the brake shoe is in the braking position, the shaft can be moved from the locking position into the unlocking position against the spring force of the second spring element while the brake shoe remains in the braking position and that, when the shaft is moved from the unlocking position into the actuating position against the spring force of the second spring element, the shaft is in engagement with the actuation point and pivots the lever. During this pivoting movement of the lever driven by the shaft of the locking bolt, the brake shoe is pivoted from the braking position into the released position and at the same time the first roller or the first pair of rollers is pivoted from the free position into the guiding position in engagement with the first running surface of the rail element.

It goes without saying that, even in an embodiment with a locking bolt, the locking bolt as an actuating means for actuating or pivoting the lever has to be driven. For this purpose, in one embodiment of the invention, the roller carriage comprises an operating means which can be actuated by a user and is disposed and configured such that, when actuated, the operating means moves the locking bolt from the locking position via the unlocking position into the releasing position. In one embodiment, the operating means is a lever, a Bowden cable or an electric actuator, for example an electric motor or an electric linear drive.

In one embodiment, the roller carriage comprises an electrical switching element, wherein the switching element includes an electrical contact and a connecting element which is connected to the contact in an electrically conductive manner. When the roller carriage is installed in a linear guide, i.e. is accommodated on the rail element, the switching element then forms a switch together with at least one contact provided on the rail element, which, in the context of the present application, is also referred to as a rail contact. For this purpose, the contact of the switching element is mounted on the carrier such that it can be displaced in transverse direction from a switched-on position into a switched-off position so that the contact can be connected to and disconnected from a complementary rail contact disposed on the rail element. The contact is mechanically operatively coupled to the lever such that a pivoting movement of the lever causes a displacement of the contact in transverse direction from the switched-on position into the switched-off position or vice versa. The connecting element is further configured such that an electrical device, in particular an electrical consumer, moved along with the roller carriage, can be connected to said connecting element.

In one embodiment, the contact is mechanically operatively coupled to the lever such that, when the brake shoe is in the released position, the contact is in the switched-off position and, when the brake shoe is in the braking position, the contact is in the switched-on position. Thus the electrical contact between the rail element and the roller carriage is provided only when the roller carriage is not in motion or cannot be moved.

In another embodiment of the invention, at least the second roller or the second pair of rollers or the third roller or the third pair of rollers has a running surface which is concave in a cross-section parallel to the rotating axle. Thus, provided that the second track is complementary, namely convex, at least the second roller or the third roller ensures that the roller carriage is guided in a transverse direction relative to the rail element. Alternatively, guidance of the second and/or the third roller or the second or third pair of rollers relative to the second track of the rail element is possible if at least one of the running surfaces of the rollers is convex and the second track of the rail element is complementarily concave.

In another embodiment, the first roller or the first pair of rollers has a cylinder jacket-shaped running surface. Tolerance compensation in transverse direction is thus also possible at the same time due to the cylinder jacket-shaped running surface of the first running roller or the first pair of running surfaces.

The aforementioned problem is also solved by a linear guide with a roller carriage according to an embodiment as discussed above and a rail element comprising a first track and a second track. The first roller is disposed such that it rolls on the first track, and the second and the third rollers are disposed such that they roll on the second track.

It goes without saying that the rail element in embodiments optionally comprises the elements discussed above with respect to the functionality of the roller carriage.

BRIEF DESCRIPTION OF THE FIGURES

Further advantages, features and possible applications will become apparent from the following description of an embodiment of the present invention and the associated figures. In the figures, the same elements are labeled with the same reference signs.

DETAILED DESCRIPTION OF PARTICULAR EMBODIMENTS

Figure 1:
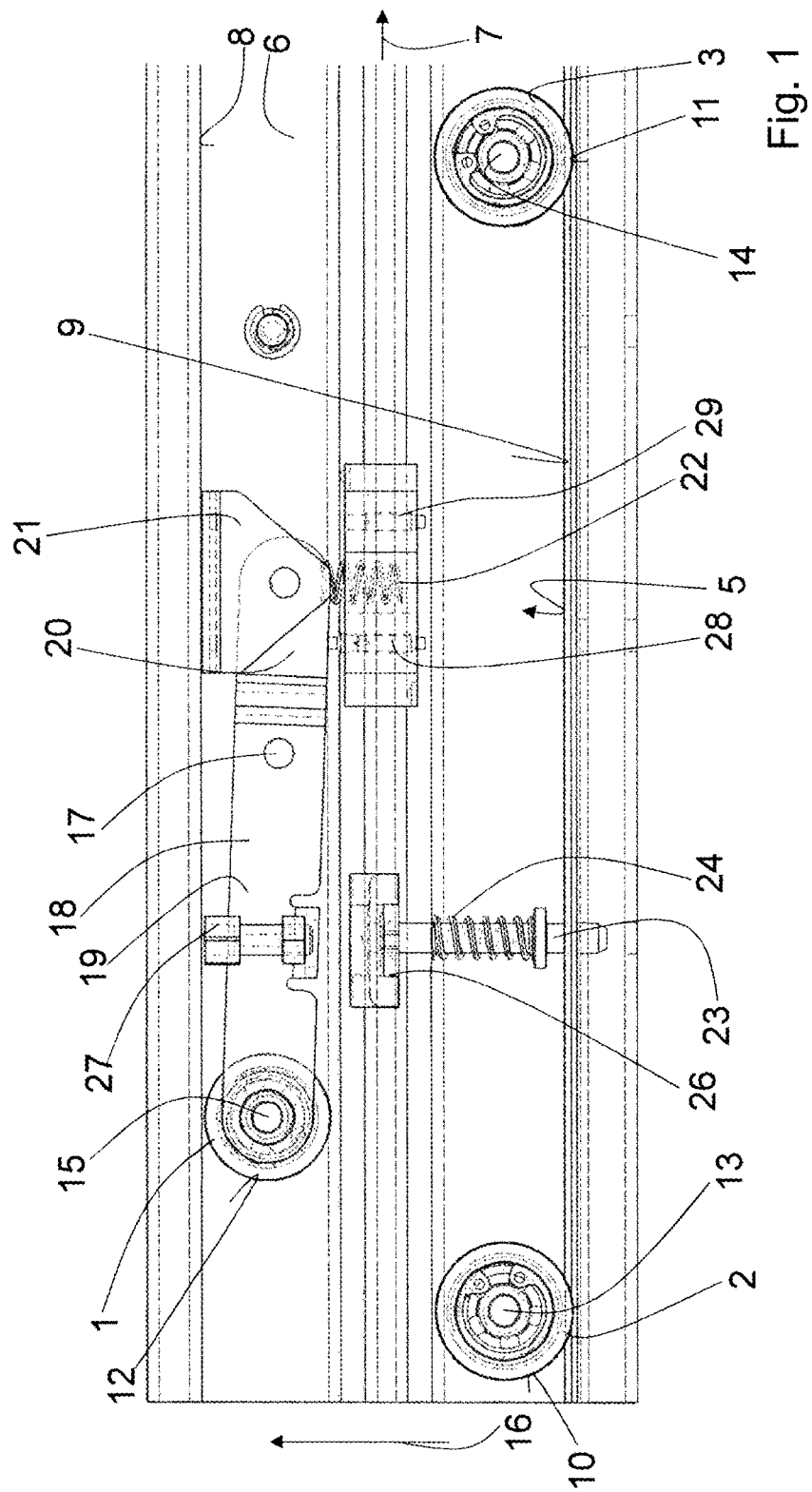
FIG. 1 is a schematic side view of a linear guide with a roller carriage according to one embodiment of the present invention.

The embodiment of a linear guide 4 now discussed with reference to FIGS. 1 to 7 consists of a roller carriage 5, which is guided in a rail element 6 with the aid of three rollers 1, 2, 3 such that it is displaceable in longitudinal direction 7 relative to the rail element 6.

A first roller 1 is provided in the roller carriage 5, which is guided on an in the illustrations upper track 8 of the rail element 6, while a second and a third roller 2, 3 are guided on an in the illustrations lower track 9 of the rail element 6.

The two lower second and third rollers 2, 3 each have a concave running surface 10, 11, as can be seen clearly in FIGS. 2 to 7, so that said second and third rollers 2, 3 roll on the convex track 9 of the rail element 6 such that the second and third rollers 2, 3 also experience lateral guidance in a direction parallel to their rotating axles 13, 14. In contrast, the first roller 1 has a cylindrical running surface 12 which compensates tolerances in a lateral direction parallel to the rotating axles 13, 14, 15 of the rollers 1, 2, 3.

The first roller 1 is disposed in longitudinal direction 7 of the roller carriage 5 between the second roller 2 and the third roller 3 in order to provide stable guidance. With very long rail elements 6, it is very difficult to maintain the tolerances on the rail element 6 that are necessary for stable and smooth running of the roller carriage. The roller carriage 5 therefore has a tolerance compensation.

This tolerance compensation is achieved because the rotating axle 15 of the first roller 1 is mounted such that it can move resiliently in a transverse direction 16 perpendicular to the longitudinal direction 7. In terms of the shown installation position of the linear guide 4, this transverse direction 16 can also be referred to as the vertical direction. The first roller 1 is mounted on a swing arm such that it can be pivoted about a pivot axis 17.

The swing arm is implemented in the form of a lever 18. The pivot axis 17 divides the lever 18 into a first arm 19, on the end of which the rotating axle 15 of the first roller 1 is mounted, and a second arm 20, on the end of which a brake shoe 21 is mounted. The second arm 20 is pretensioned in the direction of the first track 8 of the rail element 6 with the aid of a first coil spring 22. In the context of the present application, this coil spring 22 forms a first spring element.

The roller carriage 5 further comprises a locking bolt 23 which is resiliently pretensioned in the direction of the second track 9 of the rail element 6. The necessary pretensioning is provided by a second coil spring 24 which, in the context of the present application, forms a second spring element. Holes are provided at regular intervals in the rail element 6 next to the lower track 9, in which the locking bolt 23 can engage.

Figure 4:
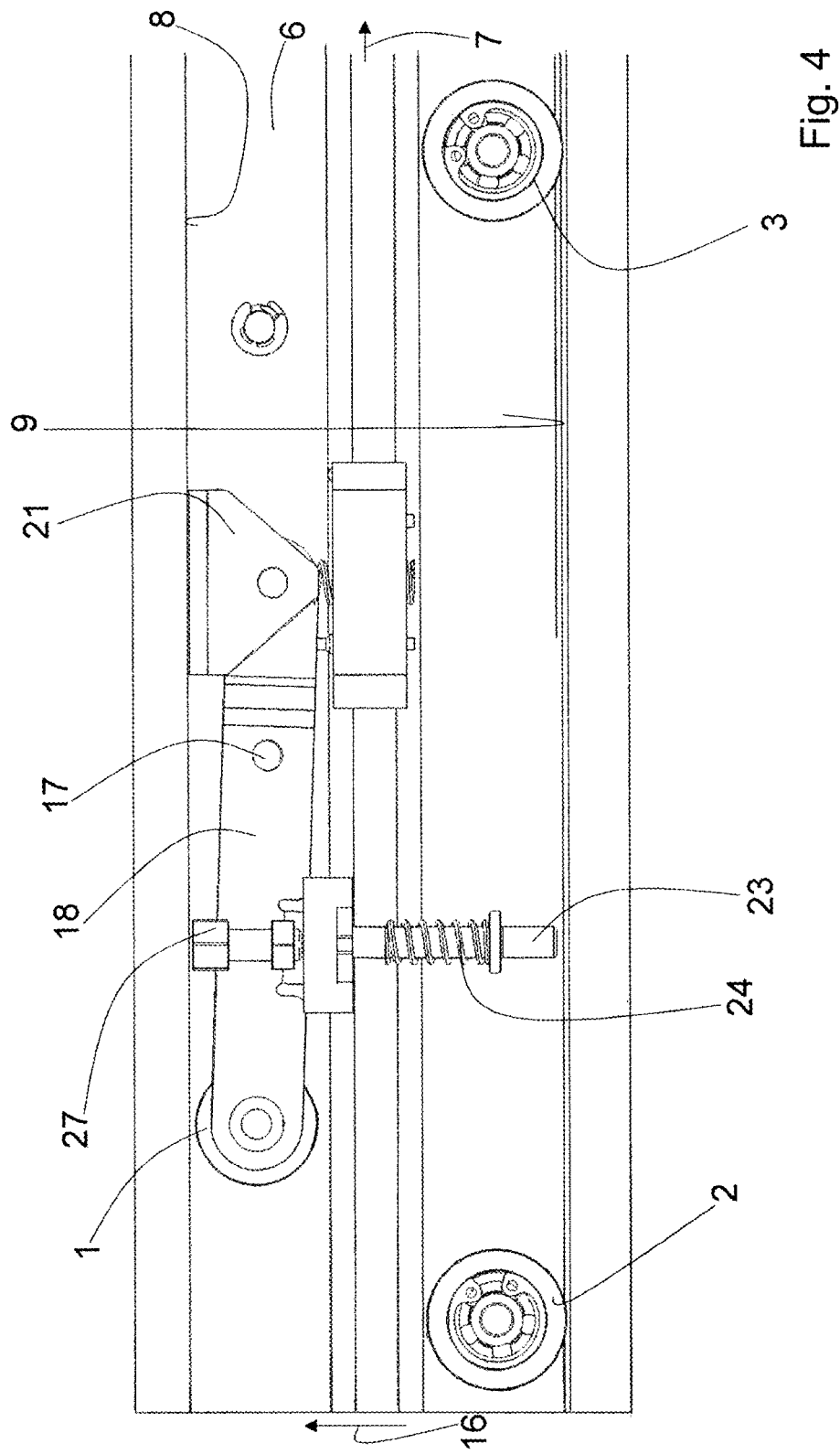
FIG. 4 is a schematic isometric, partially broken away view at an angle from the front of the linear guide of FIGS. 1 to 3, with the elements of the roller carriage in unlocking, braking and switched-on positions.
Figure 5:
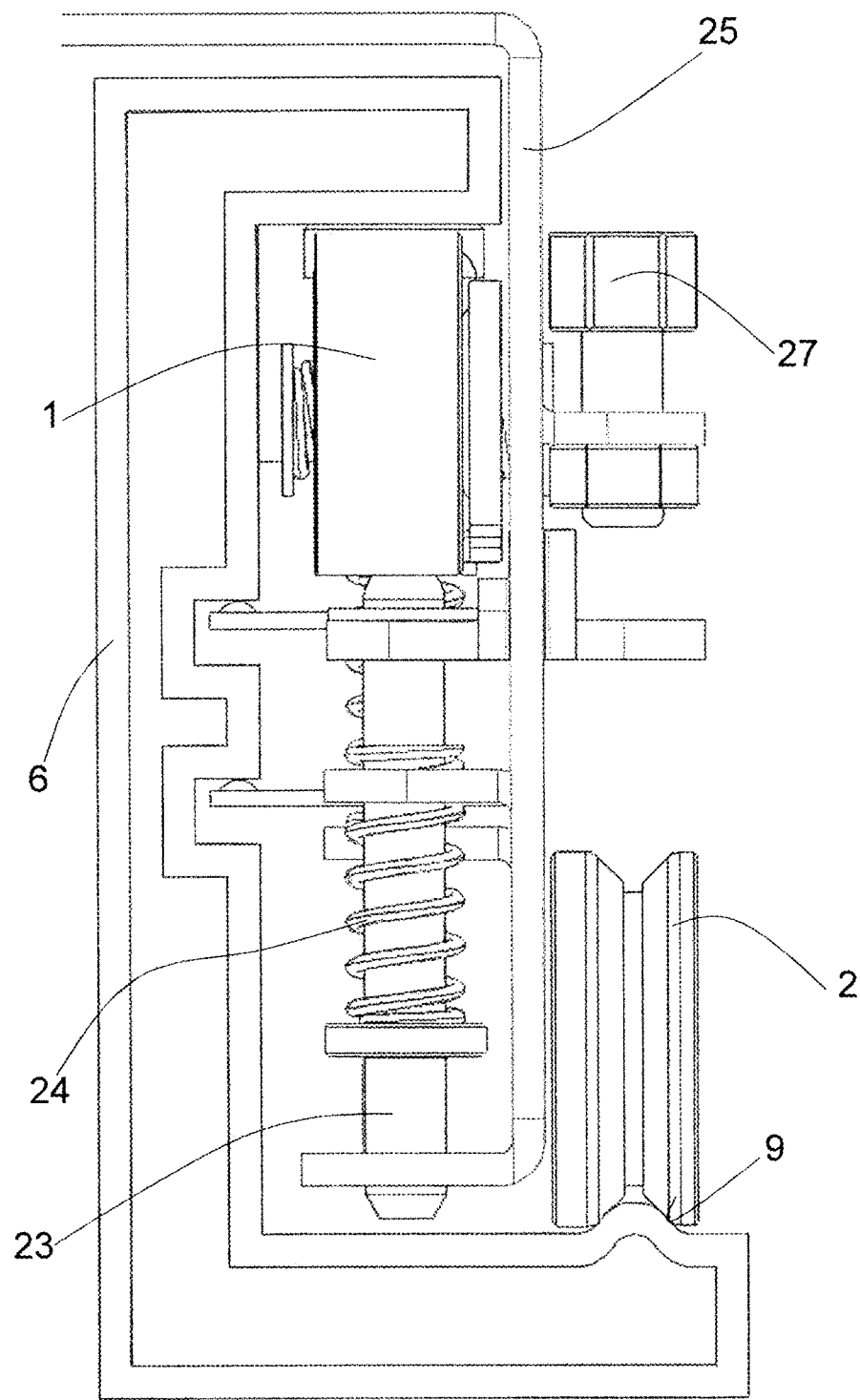
FIG. 5 is a schematic side view in longitudinal direction of the linear guide with the elements of the roller carriage in the positions shown in FIG. 4.
Figure 6:
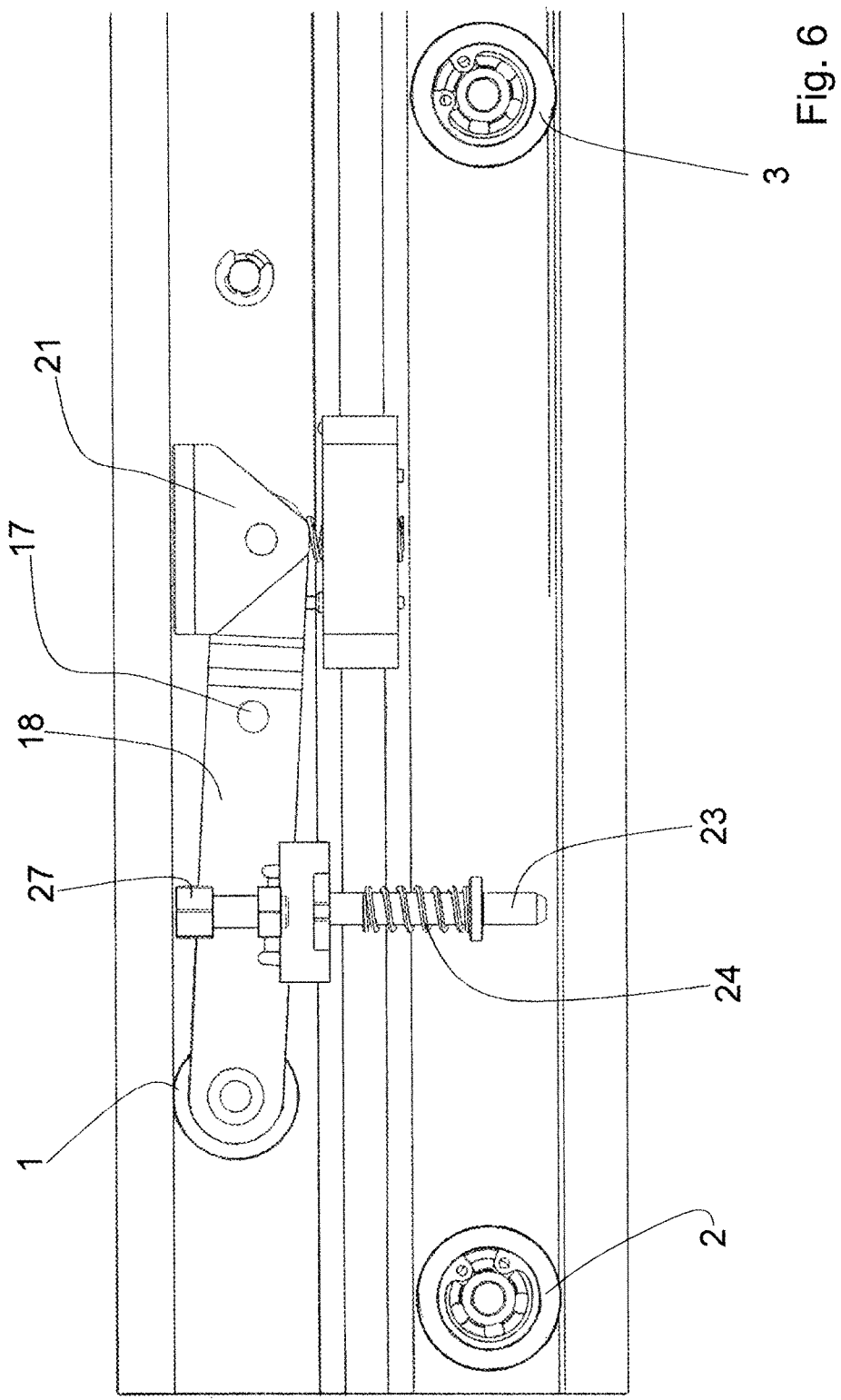
FIG. 6 is a schematic isometric, partially broken away view at an angle from the front of the linear guide of FIGS. 1 to 5, with the elements of the roller carriage in unlocking, released and switched-off positions.
Figure 7:
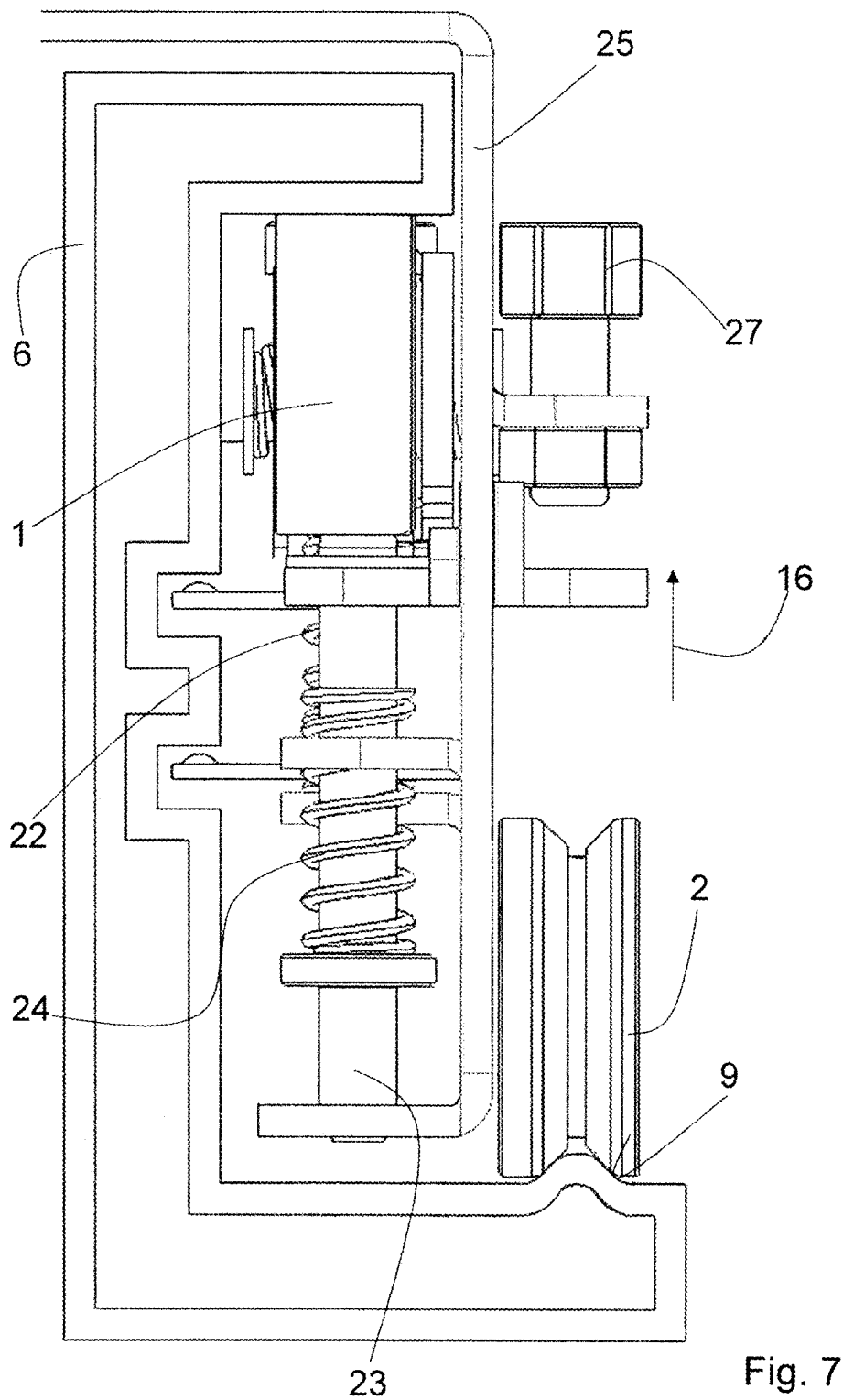
FIG. 7 is a schematic side view in longitudinal direction of the linear guide with the elements of the roller carriage in the positions shown in FIG. 6.

For this purpose, the locking bolt 23 is mounted such that it is displaceable in transverse direction 16 relative to the carrier 25 of the roller carriage 5. If the locking bolt 23 is displaced upward in transverse direction 16 in the direction of the lever 18 against the pretensioning of the second coil spring 24, it comes into engagement with an actuation point 26 on the first arm 19 of the lever 18 and, upon further movement upward in transverse direction 16, can pivot the lever 18 against the spring force of the first coil spring 22. If the locking bolt 23 is in engagement with the hole in the rail element 6 (see FIGS. 2 and 3), in the context of the present application said locking bolt 23 is in the locking position. If the locking bolt 23 is in a position as shown in FIGS. 4 and 5, wherein the locking bolt 23 is out of engagement with the rail element 6 but not yet pressing on the lever 18, in the context of the present application the locking bolt 23 is in the unlocking position. If the locking bolt 23 is moved further upward in transverse direction 116, it comes into engagement with the actuation point 26 of the lever 18. It therefore presses the lever 18 upward and, in the context of the present application, is then in the actuating position as defined (see FIGS. 6 and 7).

In the embodiment according to FIGS. 1 to 7, the locking bolt 23 is manually actuated by a user with the aid of a Bowden cable as the operating means. Of this Bowden cable, FIGS. 1 to 7 show only an adjustable tension counter bearing 27. The core of the cable acts directly on a fastening section (not shown) on the locking bolt 23.

The elements provided on the roller carriage 5 serve to lock the roller carriage 5, and also an element fastened to it, securely to the rail element 6 when the roller carriage is not to be moved. The elements of the roller carriage 5 also allow the roller carriage 5 to be unlocked while it is still being braked with the aid of the brake shoe 21. Last but not least, the roller carriage 5 provides an electrical connection between a rail contact and a switching element of the roller carriage 5 only when the roller carriage 5 is at least being braked.

The function of the individual elements of the roller carriage 5 in cooperation with the elements of the rail element 6 will be discussed in the following. In this description, it is assumed that the roller carriage 5 is initially in a stationary state, in which it is blocked or locked with respect to a displacement in longitudinal direction 7 relative to the rail element 6 with the aid of the locking bolt 23. However, the starting point could just as well be an unlocked state of the roller carriage 5, wherein the locked state is reached at the end of the movements of the individual elements of the roller carriage 5.

Figure 2:
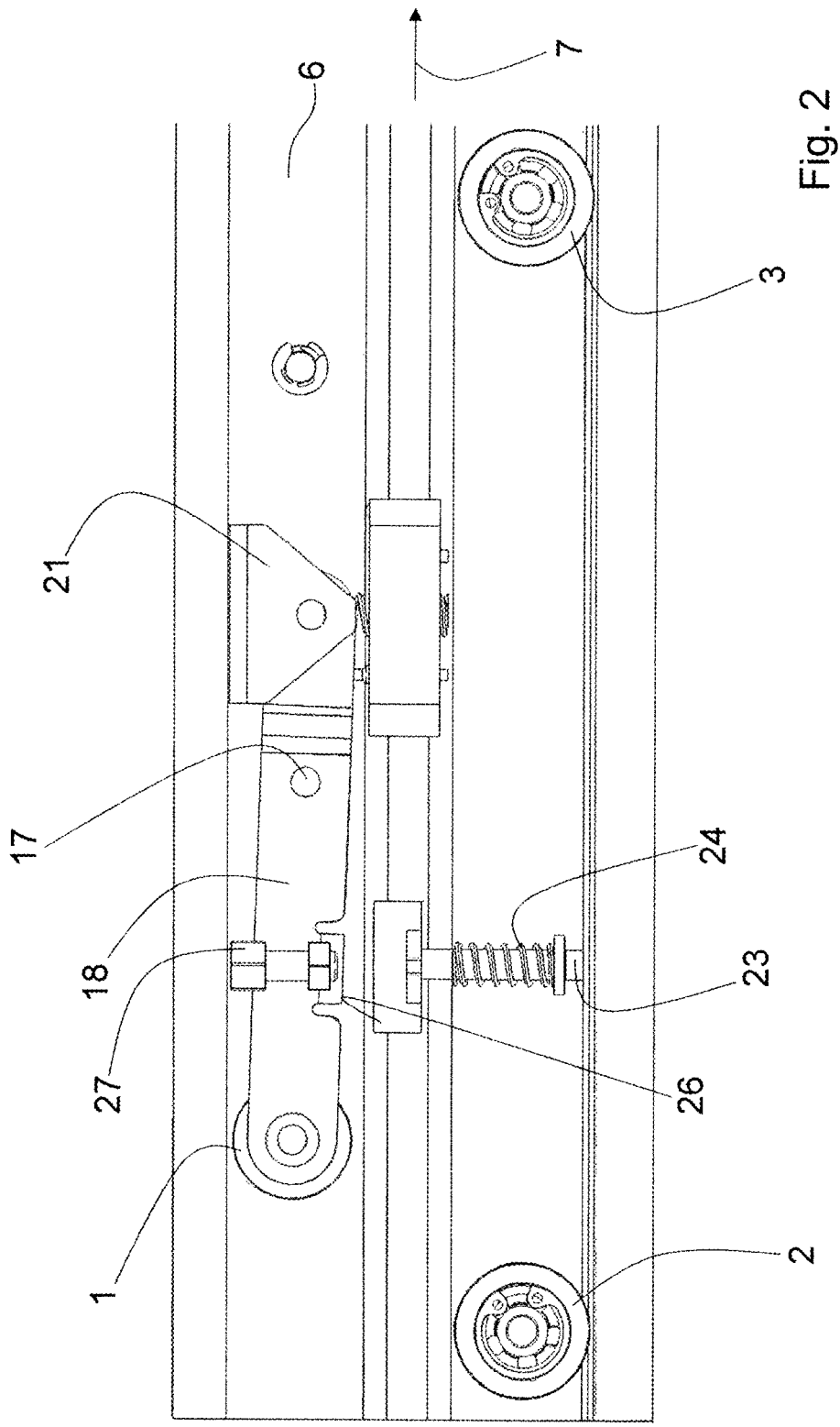
FIG. 2 is an isometric, partially broken away view at an angle from the front of the linear guide of FIG. 1 with the elements of the roller carriage in the locking, braking and switched-on positions.
Figure 3:
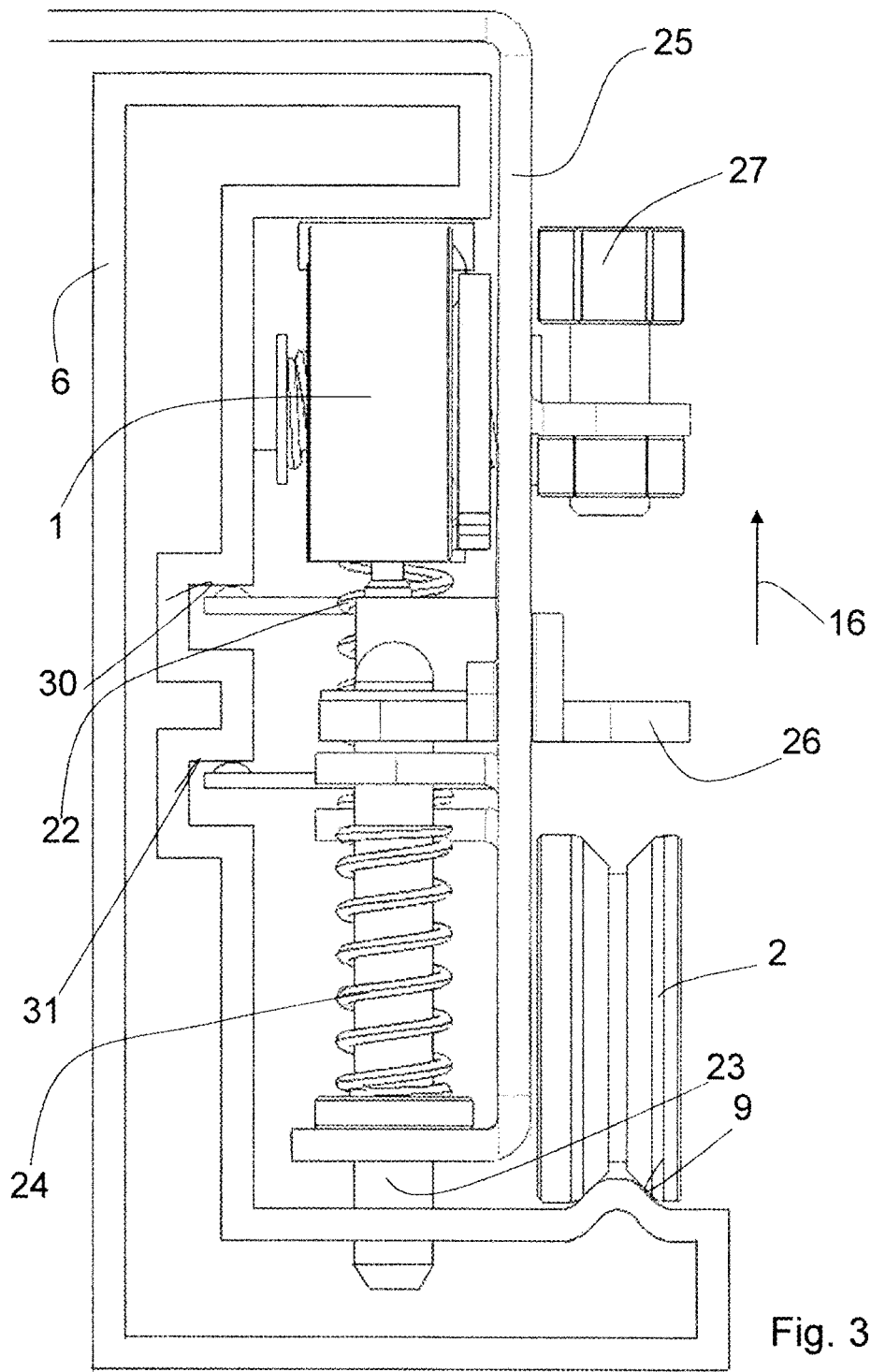
FIG. 3 is a schematic side view in longitudinal direction of the linear guide with the elements of the roller carriage in the positions shown in FIG. 2.

FIGS. 2 and 3 show the locked state of the roller carriage 5 relative to the rail element 6. In this state, two electrical contacts 28, 29 at the same time are in electrical contact with conductive tracks 30, 31, which are integrated in the rail element 6. In the shown embodiment, these contacts 28, 29, 30, 31 serve to supply current and voltage to an electrical consumer that is moved along with the roller carriage 5 or an element mounted on it when the roller carriage 5 is in the locked state relative to the rail element 6.

The electrical contacts 28, 29 are part of an electrical contact element of the roller carriage 5. The switching element further comprises a connecting element in the form of two sockets that is connected to the two contacts 28, 29 in an electrically conductive manner, wherein an electrical consumer is connected to the contacts via said socket.

When a user now actuates the Bowden cable, the locking bolt 23 is pulled upward in transverse direction 16 against the pretensioning of the second spring element 24 and reaches the unlocking position as shown in FIGS. 4 and 5. In order to prevent the roller carriage 5 from already starting to move in this unlocking position of the locking bolt 23, the roller carriage 5 comprises a brake in addition to the locking bolt 23. The core component of this brake is the brake shoe 21 on the second arm 20 of the lever 18. This brake shoe 21 is pretensioned in frictional engagement with the first track 8 of the rail element 6 by the first coil spring 22. Therefore, in the context of the present application, the brake shoe 21 in the illustrations of FIGS. 1 to 5 is in the braking position. At the same time, due to the coupling of the movements of the brake shoe 21 and the first roller 1 via the lever 18, the first roller 1 is in the free position. In the free position, the first roller 1 is not in engagement with the track 8 of the rail element 6. In this unlocked, braked state of the roller carriage 5, the electrical contacts 28, 29 remain in engagement with the corresponding rail contacts 30, 31 of the rail element 6.

If the locking bolt 23 is moved further upward in transverse direction 16 in the direction of the first track 8 with the aid of the Bowden cable, it comes into engagement with the actuation point 26 of the lever 18 and presses said actuation point upward against the spring force of the first coil spring 22 with the first arm 19 of the lever 18. Thus, the locking bolt 23 effects a pivoting movement of the lever 18. The brake shoe 21 comes out of engagement with the track 8 and, at the same time, the first roller 1 comes into engagement with the first track 8.

The roller carriage 5 is now unlocked, unbraked and freely displaceable relative to the rail element 6 in longitudinal direction 7. As a result of a mechanical coupling of the two contacts 28, 29 of the switching element to the second arm 20 of the lever 18, the two contacts 28, 29 of the switching element are also brought out of engagement with the rail contacts 30, 31 of the rail element 6 during the pivoting movement of the lever 18. The electrical connection between the roller carriage 5 and the rail element 6 is interrupted.

For purposes of the original disclosure, it must be noted that all features as they are revealed to a person skilled in the art by the present description, the drawings and the claims, even if they were described specifically only in connection with certain further features, can be combined both individually and in any combination with others of the features or groups of features disclosed here, unless this has been expressly excluded or technical circumstances render such combinations impossible or pointless. A comprehensive, explicit description of all conceivable combinations of features is omitted here only for the sake of brevity and readability of the description.

Although the invention has been shown and described in detail in the drawings and the foregoing description, this presentation and description is merely illustrative and is not intended to limit the scope of protection as defined by the claims. The invention is not limited to the disclosed embodiments.

Variations of the disclosed embodiments are obvious to the skilled person from the drawings, the description and the accompanying claims. In the claims, the word "comprise" does not exclude other elements or steps, and the indefinite article "a" or "an" does not exclude a plurality. The mere fact that certain features are claimed in different claims does not preclude their combination. Reference signs in the claims are not intended to limit the scope of protection.

LIST OF REFERENCE SIGNS 1, 2, 3 Roller
4 Linear guide
5 Roller carriage
6 Rail element
7 Longitudinal direction
8, 9 Track
10, 11, 12 Running surface
13, 14, 15 Rotating axle
16 Transverse direction
17 Pivot axis
18 Lever
19 First arm of the lever
20 Second arm of the lever
21 Brake shoe
22 First coil spring
23 Locking bolt
24 Second coil spring
25 Carrier
26 Actuation point
27 Tension counter bearing
28, 29 Electrical contacts
30, 31 Rail contacts

The invention claimed is:

1. A roller carriage for displaceable linear guidance in a longitudinal direction on a rail element, comprising:
   a carrier;
   a first roller;
   a second roller; and
   a third roller;
   wherein every one of the first roller, the second roller and the third roller is mounted on the carrier such that each can rotate about a rotating axle,
   wherein the rotating axles are substantially parallel to one another, and
   wherein the first roller, the second roller and the third roller are disposed on the roller carriage such that the first roller can be brought into engagement with a first track of the rail element and the second roller and the third roller can be brought into engagement with a second track of the rail element,
   wherein the first roller is mounted such that it can move in a transverse direction perpendicular to the longitudinal direction relative to the carrier,
   wherein the movably mounted first roller is resiliently pretensioned in the transverse direction by a first spring element,
   wherein the roller carriage comprises a lever which can be pivoted relative to the carrier about a pivot axis,
   wherein the lever comprises a first arm,
   wherein the movably mounted first roller is mounted on the first arm such that it can rotate about the rotating axle,
   wherein the lever is resiliently pretensioned in a pivoting direction by the first spring element,
   wherein the lever comprises a second arm,
   wherein the pivot axis divides the lever into the first arm and the second arm, and
   wherein a brake shoe which can be brought into engagement with the first track is disposed on the second arm so that the movably mounted first roller can be pivoted from a guiding position into a free position and at the same time the brake shoe can be pivoted from a released position into a braking position.

2. The roller carriage according to claim 1, wherein the first roller is disposed in the longitudinal direction between the second roller and the third roller.

3. The roller carriage according to claim 1, wherein the lever is resiliently pretensioned such that, in a relatively relaxed state of the first spring element, the brake shoe is in the braking position and the movably mounted first roller is in the free position and that, in a relatively tensioned state of the first spring element, the brake shoe is in the released position and the movably mounted first roller is in the guiding position.

4. The roller carriage according to claim 1, wherein the lever comprises an actuation point which can be brought into engagement with an actuating means.

5. The roller carriage according to claim 1, wherein the roller carriage comprises an actuating means, wherein the actuating means comprises an operating element which can be actuated by a user.

6. The roller carriage according to claim 1, wherein the roller carriage comprises an actuating means,
   wherein the actuating means comprises a locking bolt,
   wherein the locking bolt is mounted on the carrier such that it can move in the transverse direction from a locking position via an unlocking position into an actuating position,
   wherein the locking bolt is resiliently pretensioned into the locking position by a second spring element,
   wherein the locking bolt and the lever having the actuation point are configured and disposed such that, when the brake shoe is in the braking position, the locking bolt can be moved from the locking position into the unlocking position against a spring force of the second spring element while the brake shoe remains in the braking position, and that, when the locking bolt is moved from the unlocking position into the actuating position against the spring force of the second spring element, the locking bolt is in engagement with the actuation point and pivots the brake shoe from the braking position into the released position and pivots the first guide roller from the free position into the guiding position.

7. The roller carriage according to claim 6, wherein the actuating means of the roller carriage further comprises an operating means which can be actuated by a user and is disposed and configured such that, when actuated, the operating means moves the locking bolt from the locking position via the unlocking position into the releasing position.

8. The roller carriage according to claim 1, wherein the roller carriage comprises an electrical switching element, wherein the switching element comprises
- an electrical contact; and
- a connecting element which is connected to the electrical contact in an electrically conductive manner,
- wherein the electrical contact is mounted on the carrier such that it can be displaced in the transverse direction from a switched-on position into a switched-off position so that the electrical contact can be connected to and disconnected from a complementary rail contact disposed on the rail element,
- wherein the electrical contact is mechanically operatively coupled to the lever such that a pivoting movement of the lever causes a displacement of the electrical contact in the transverse direction from the switched-on position into the switched-off position or vice versa, and
- wherein the connecting element is configured such that an electrical device moved along with the roller carriage, can be connected to said connecting element.

9. The roller carriage according to claim 8, wherein the electrical contact is mechanically operatively coupled to the lever such that, when the brake shoe is in the released position, the electrical contact is in the switched-off position and when the brake shoe is in the braking position, the electrical contact is in the switched-on position.

10. The roller carriage according to claim 1, wherein at least the second roller or the third roller has a running surface which is concave in a cross-section parallel to the rotating axle.

11. A linear guide comprising:
- a roller carriage according to claim 1; and
- a rail element comprising a first track and a second track, wherein the first roller is disposed such that the first roller rolls on the first track and the second roller and the third roller are disposed such that they roll on the second track.

* * * * *